United States Patent [19]

Sato

[11] Patent Number: 5,032,899
[45] Date of Patent: Jul. 16, 1991

[54] INTERPOLATION SIGNAL GENERATING CIRCUIT FOR PROGRESSIVE SCANNING CONVERSION SYSTEM TELEVISION RECEIVER

[75] Inventor: Koichi Sato, Kanagawa, Japan
[73] Assignee: Kabushiki Kaisha Toshiba, Kawasaki, Japan
[21] Appl. No.: 383,048
[22] Filed: Jul. 21, 1989

[30] Foreign Application Priority Data
Jul. 22, 1988 [JP] Japan ................... 63-182955

[51] Int. Cl.⁵ ................... H04N 7/01; H04N 11/20
[52] U.S. Cl. ................... 358/11; 358/140
[58] Field of Search ........... 358/11, 140, 31, 138

[56] References Cited
U.S. PATENT DOCUMENTS

| 2,921,124 | 1/1960 | Graham | 358/138 |
| 4,673,978 | 6/1987 | Dischert | 358/140 |
| 4,698,675 | 10/1987 | Casey | 358/140 |
| 4,831,435 | 5/1989 | Song et al. | 358/140 |

FOREIGN PATENT DOCUMENTS

| 5379421 | 7/1978 | Japan . | |
| 150687 | 10/1980 | Japan | 358/31 |
| 0079379 | 5/1983 | Japan | 358/140 |
| 101583 | 6/1983 | Japan . | |
| 151592 | 8/1984 | Japan | 358/31 |
| 62-43989 | 2/1987 | Japan . | |

OTHER PUBLICATIONS

NEC Technical Journal, vol. 37, No. 4, "The Enhanced Definition Digital Television by Non-Interlace Scanning"; Klwaibana et al.; 1987.

Primary Examiner—John W. Shepperd
Attorney, Agent, or Firm—Oblon, Spivak, McClelland, Maier & Neustadt

[57] ABSTRACT

A system for generating interpolation signals for a progressive scanning conversion television system. The sysetem includes a Y/C separator for separating the luminance (Y) and chrominance (C) signals from a composite video signal, an interpolation Y signal generating circuit for receiving the separated Y signal and generating an interpolated Y signal, the interpolation Y signal generating circuit including at least one low pass filter to remove the high frequency signal components from the separated Y signal and a circuit to alternately provide the separated Y signal and the interpolated Y signal along with the C signal to generate a progressive scanning television signal.

7 Claims, 11 Drawing Sheets

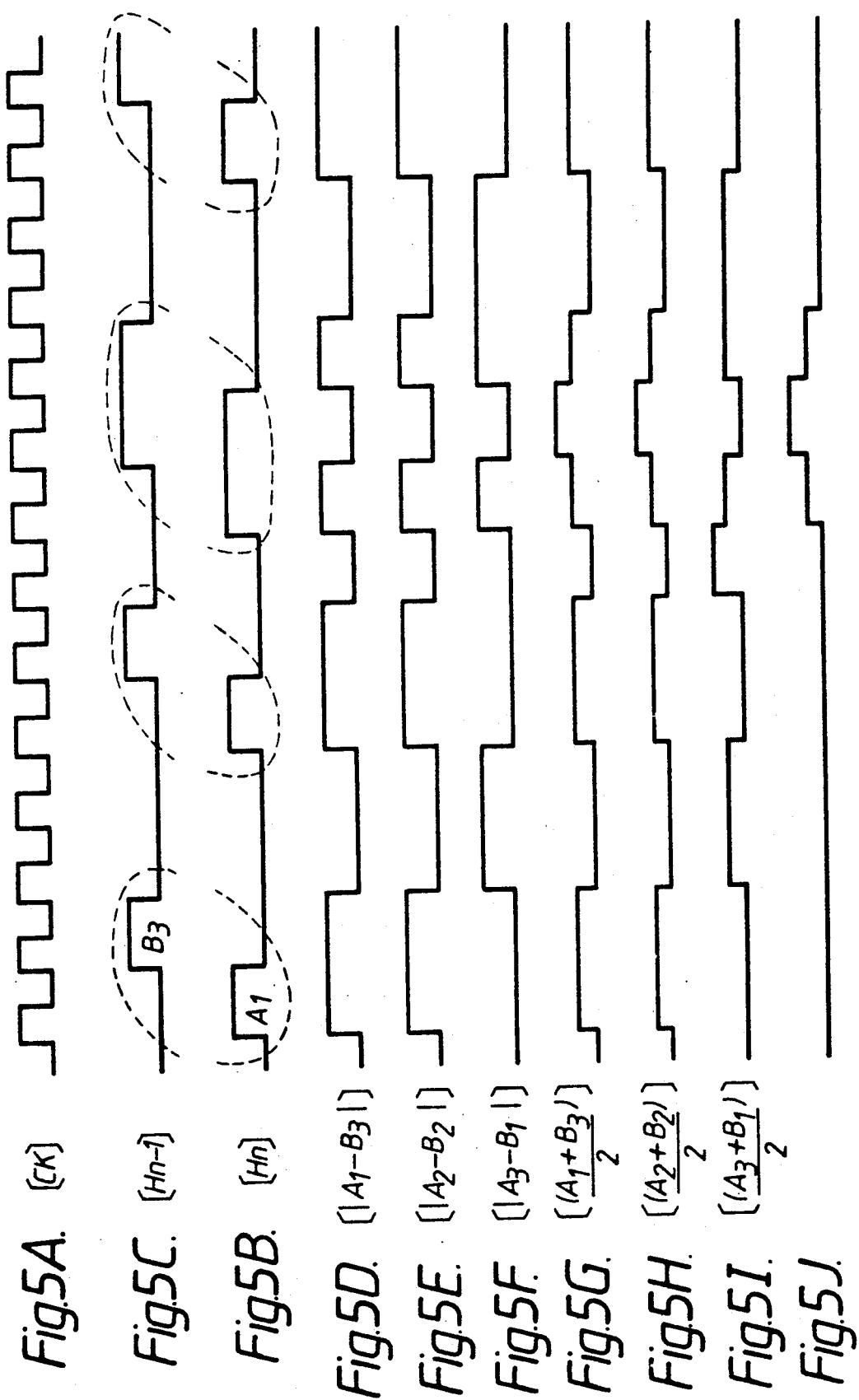

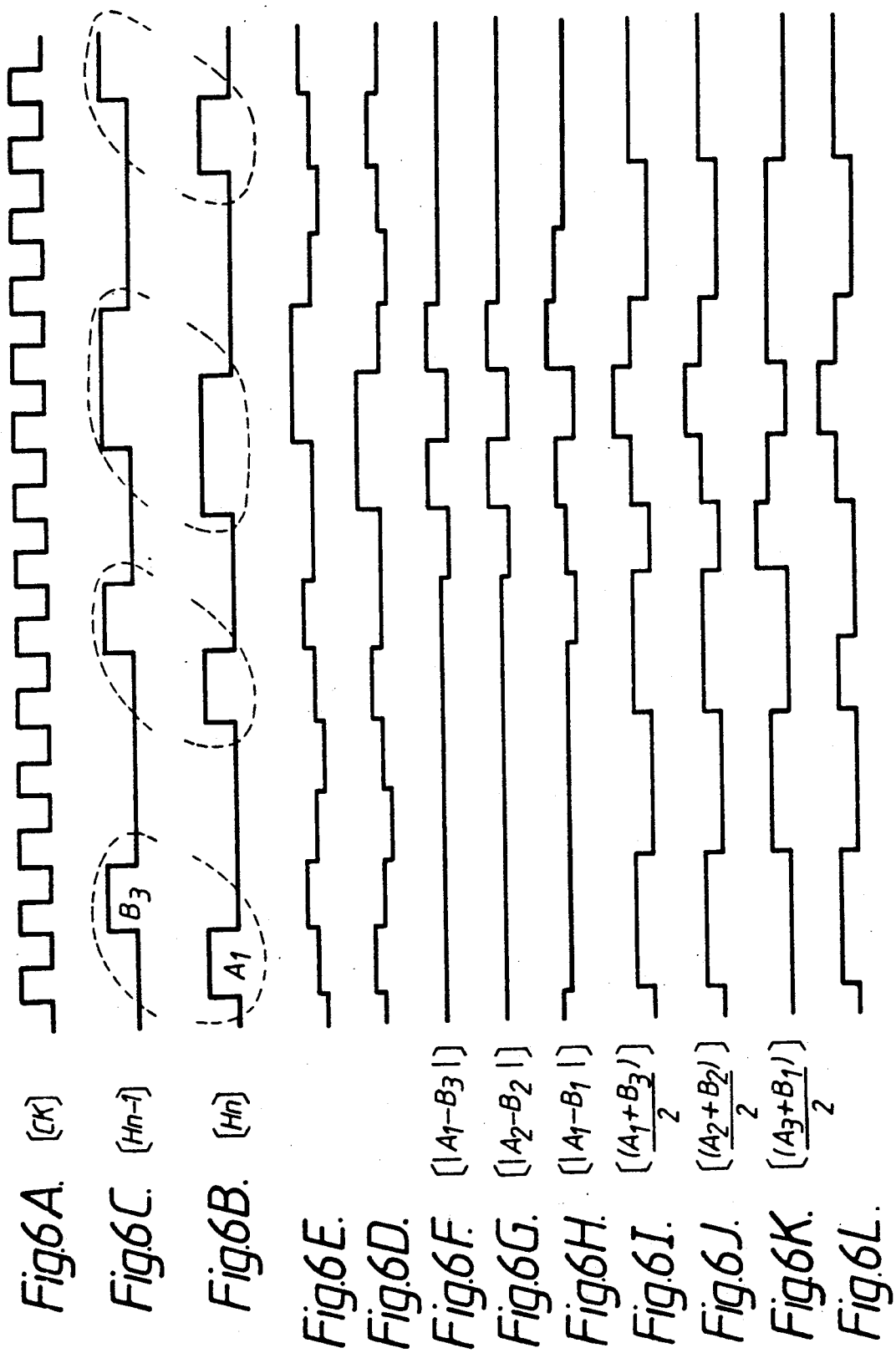

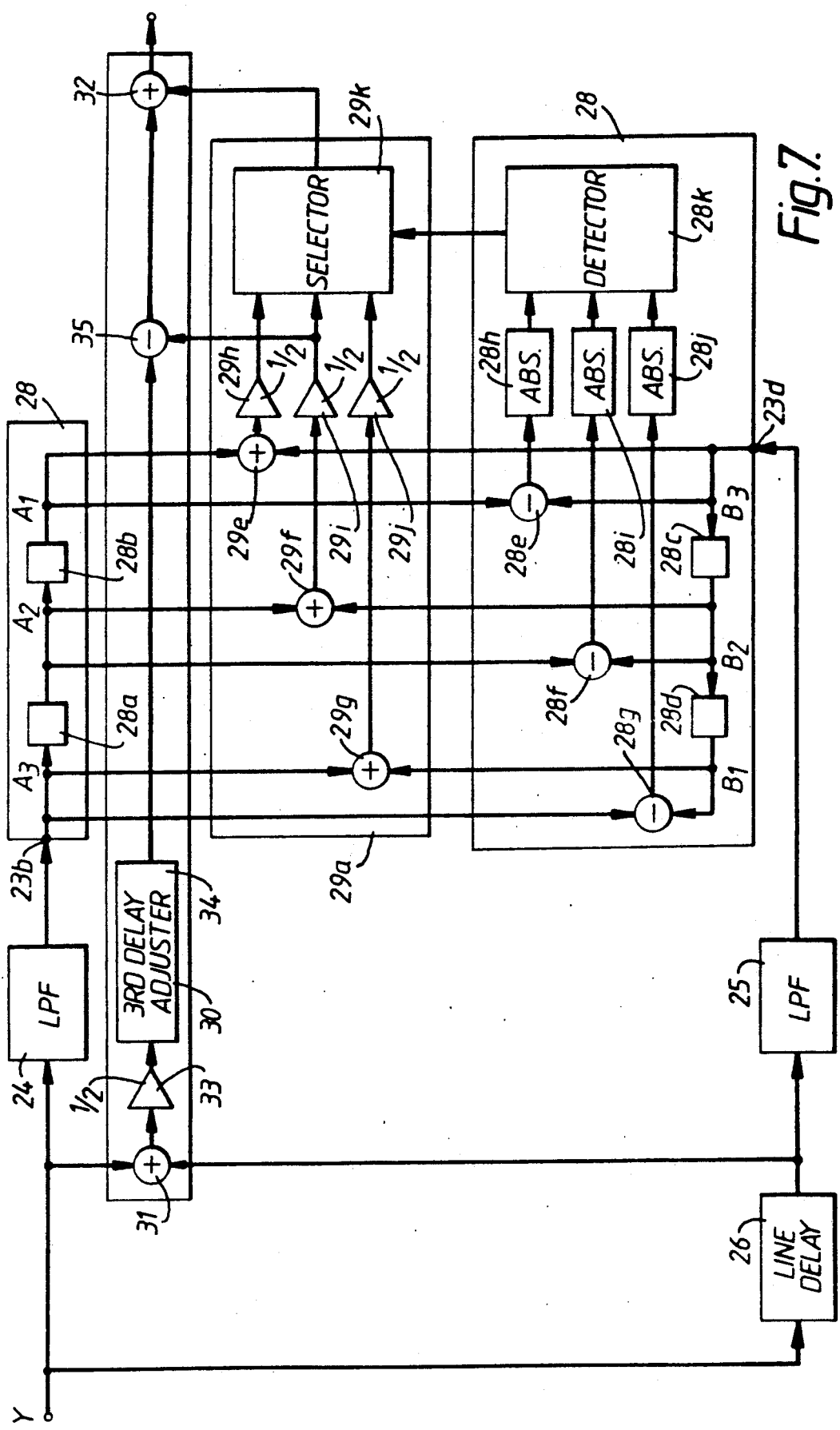

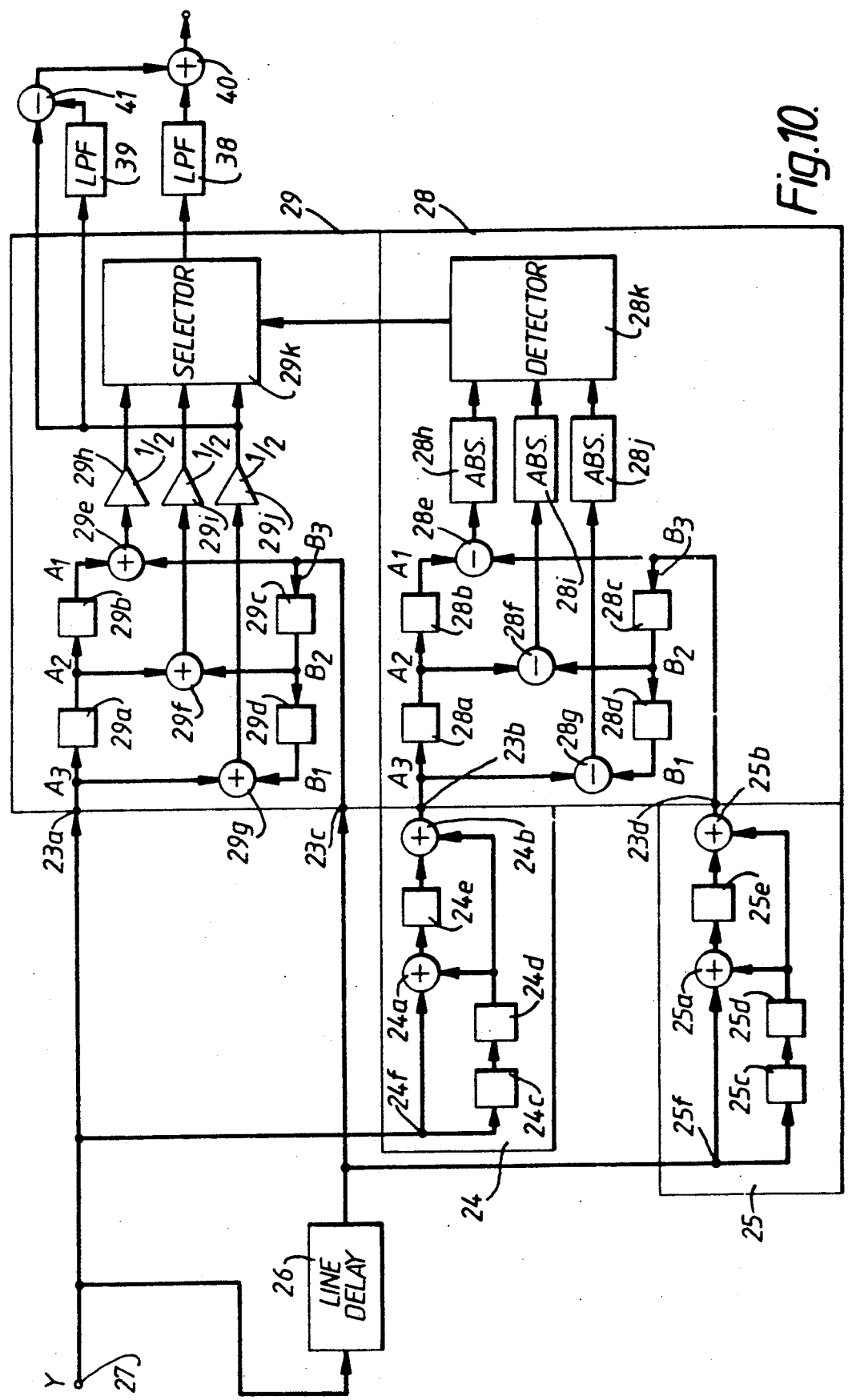

INTERPOLATION SIGNAL GENERATING CIRCUIT FOR PROGRESSIVE SCANNING CONVERSION SYSTEM TELEVISION RECEIVER

FIELD OF THE INVENTION

The present invention relates generally to a scanning conversion system for converting digital television signals transmitted by an interlaced scanning system into those of a progressive scanning system. More particularly, it relates to an interpolation signal generating circuit for a progressive scanning conversion system television receiver.

BACKGROUND OF THE INVENTION

The interlaced scanning system is used widely in conventional television systems. In the interlaced scanning system, one frame image is composed of two fields; an odd field and an even field. Therefore, in an NTSC system (interlaced scanning system) television signal, for example, the number of scanning lines per frame image is 525 lines, and in each field, the number is halved to 262.5 lines. In a displayed image obtained with the interlaced scanning system, vertical scanning lines are generally rough and conspicuous, thus causing deterioration of the quality of the displayed images.

Progressive scanning television receivers also have been proposed in the art. In a progressive scanning television receiver the horizontal line rate is doubled, and each line of field image is displayed twice. As a result, a displayed image has twice the usual number of scanning lines found in the interlaced scanning system. Thus, various adverse influences on the displayed image, such as the visibility of the vertical line structure and line flicker caused by the interlaced scanning system, are reduced. Accordingly, progressive scanning television receivers facilitate the overall improvement of picture quality.

For doubling the horizontal line rate, additional scanning lines are interpolated between the scanning lines of the interlaced scanning system. Conventionally, the additional scanning lines or interpolation lines are produced by processing the interlaced system scanning lines of each field. For example, the interpolation lines can be obtained by simply using the same interlaced system scanning lines, or by summing two adjacent lines of the interlaced scanning system.

In one known form of progressive scanning television receiver, a scanning conversion circuit with an interpolation line generating circuit, as shown in FIG. 1, is provided. In the scanning conversion circuit a composite video signal of the interlaced scanning system is applied to a luminance-chrominance signal separator (referred to as Y/C separator hereinafter) 10 through an input terminal 11. Thus, a luminance signal (referred to as Y signal hereinafter) is output from a terminal 10a, while a chrominance signal (referred to as C signal hereinafter) is output from a terminal 10b. The Y signal is supplied to four paths. The Y signal on a first path is applied to a first speed doubler 12 through a first delay adjuster 13. Thus, a direct Y signal for progressive scanning is output from the first speed doubler 12. The Y signal on a second path is directly applied to a mixer 14. The Y signal on a third path is applied to a mixer 14 through a field delay circuit 15. The Y signal on a fourth path is applied to an image motion detector 16.

The mixer 14, the field delay circuit 15 and the image motion detector 16 constitute an interpolation signal generator 17. The image motion detector 16 controls a ratio between the Y signals applied to the mixer 14 through the second and third paths in response to a detection signal output from the image motion detector 16. Thus, an interpolation Y signal for the progressive scanning is generated by the mixer 14. The interpolation Y signal output from the mixer 14 is applied to a second speed doubler 18.

The first and second speed doublers 12 and 18 double the scanning speed of both the direct Y signal and the interpolation Y signal. The direct Y signal and the interpolation Y signal are alternately introduced to an interpolation Y signal output terminal 19. Thus, the direct Y signal and the interpolation Y signal are provided for the progressive scanning of the Y signal component.

The C signal output from the terminal 10b of the Y/C separator 10 is applied to a third speed doubler 20 through a second delay adjuster 21. The third speed doubler 20 also doubles the scanning speed of the C signal. The C signal is introduced to a C signal output terminal 22. Thus, the C signal is provided for the progressive scanning of the C signal component.

The first and second delay adjusters 13 and 21 are used for matching the phases of the direct Y signal and the C signal with the phase of the interpolation Y signal.

The field delay circuit 15 delays the Y signal for a one field period. Thus, the mixer 14 mixes a Y signal Yn of the current field applied through the second path with another Y signal Yn-1 of a prior field which is prior to the current field by one field period. As a result, the interpolation Y signal has information responsive to the Y signals Yn and Yn-1 of both the current and prior fields. The Y signals Yn and Yn-1 of the current and prior fields are used as a dynamic component of the Y signal (referred to as dynamic Y signal hereinafter) and a static component of the Y signal (referred to as static Y signal hereinafter), respectively.

Further the image motion detector 16 complementarily varies the gains of the dynamic and static Y signals Yn and Yn-1. The complementary gain control is carried out by an output from the image motion detector 16. Thus, the ratio between the dynamic and static Y signals Yn and Yn-1 varies in response to the detection output from the image motion detector 16. For example, a component of the dynamic Y signal Yn prevails over a component of the static Y signal Yn-1 in the interpolation Y signal when an intensive image motion is detected by the image motion detector 16.

The conventional interpolation line generating circuit 17, as shown in FIG. 1, has a drawback that the circuit can not always generate a correct interpolation signal. For example, when a composite video signal representing an inclined line image is input, an interpolation signal obtained by the interpolation line generating circuit 17 is displaced form the inclined line image. Thus, a waving folded line image is displayed during the progressive scanning.

Recently, another interpolation line generating circuit has been developed. This interpolation line generating circuit includes a best pixel interrelating interpolation signal generator. The best pixel interrelating interpolation signal generator comprises a pixel interrelation detector and a best pixel interrelating interpolation signal selector. The pixel interrelation detector compares interrelations of several predetermined pairs of pixels of corresponding lines of the current and prior fields with each other. Thus the pixel pair with the highest interrelation is detected. The pixel pair selector calculates absolute values for every pair of pixels. The best pixel interrelating interpolation signal selector selectively outputs the absolute value of the suitable pixel pair which are most interrelated with each other, according to the detection signal output from the pixel interrelation detector.

This type of interpolation line generating circuit can be adapted to display an inclined line image. Thus, such an inclined line image is correctly displayed without waving or other distortions. However, the latter interpolation line generating circuit sometimes fails to detect the pixel pair with the highest interrelation. This results in degradation of the displayed image.

SUMMARY OF THE INVENTION

It is, therefore, an object of the present invention to provide an interpolation signal generating circuit for a progressive scanning conversion system television receiver which is able to generate a suitable interpolation signal without failing to detect the pixel pair with the highest interrelation.

In order to achieve the above object, an interpolation signal generating circuit for a progressive scanning conversion system television receiver according to one aspect of the present invention, includes a Y/C separator for separating the luminance (Y) and chrominance (C) signals from a composite video signal, an interpolation Y signal generating circuit for receiving the separated Y signal and generating an interpolated Y signal, the interpolation Y signal generating circuit including at least one low pass filter to remove the high frequency signal components from the separated Y signal and a circuit to alternately provide the separated Y signal and the interpolated Y signal along with the C signal to generate a progressive scanning television signal.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 5A and 6A–6L are waveform charts for explaining the operation of FIG. 3;

FIG. 7 is a block diagram showing a second embodiment of the interpolation signal generating circuit for a progressive scanning conversion system television receiver according to the present invention;

FIG. 10 is a block diagram showing a fourth embodiment of the interpolation signal generating circuit for a progressive scanning conversion system television receiver according to the present invention.

DESCRIPTION OF THE PREFERRED EMBODIMENTS

Figure 1:
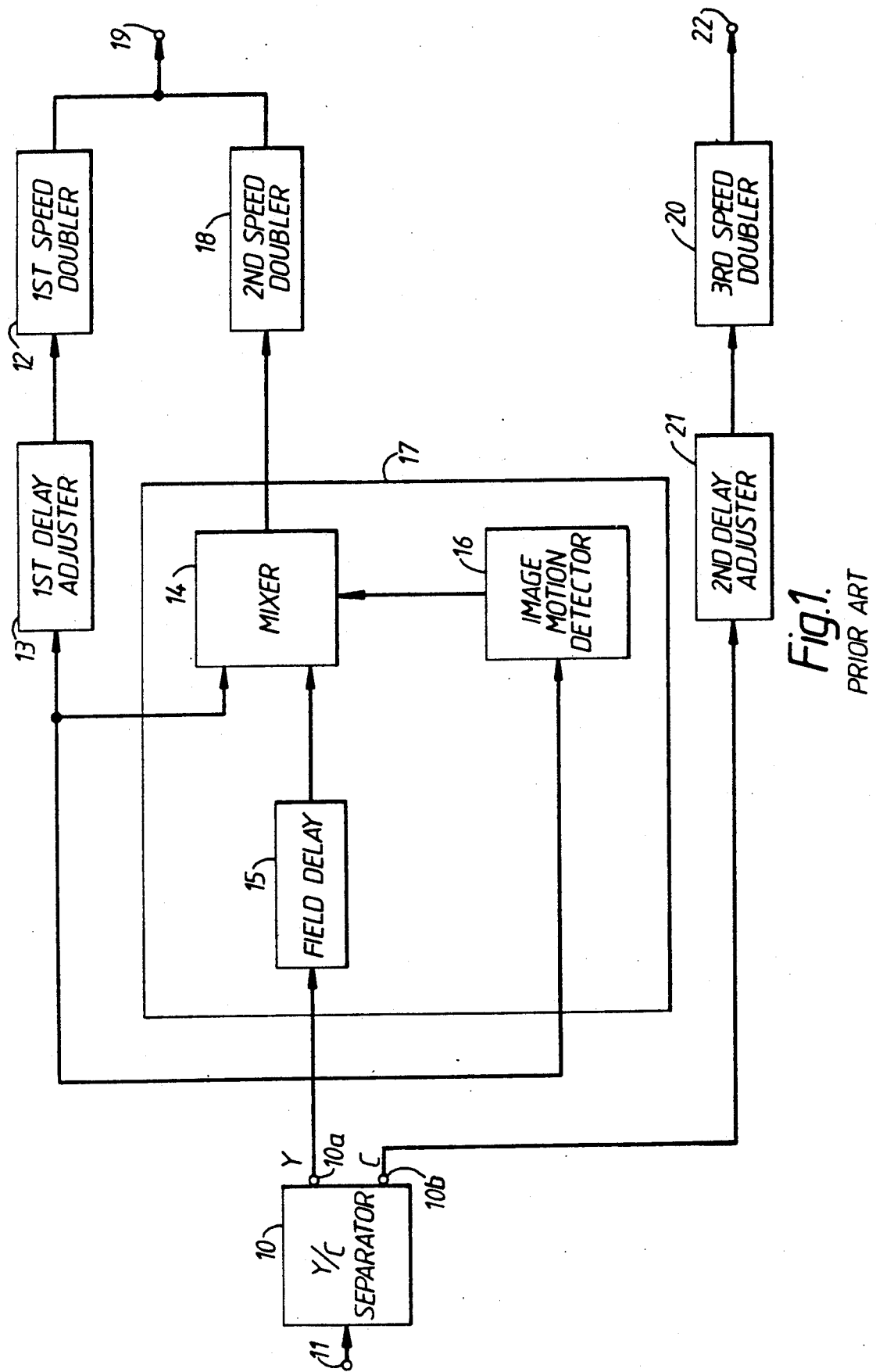
FIG. 1 is a block circuit diagram to explain the progressive scanning conversion system using line memories.

The present invention will be described in detail with reference to FIGS. 2 through 10. Throughout this description and drawings, reference numerals or letters used in FIG. 1 will be used to designate like or equivalent elements for simplicity of explanation.

Figure 2:
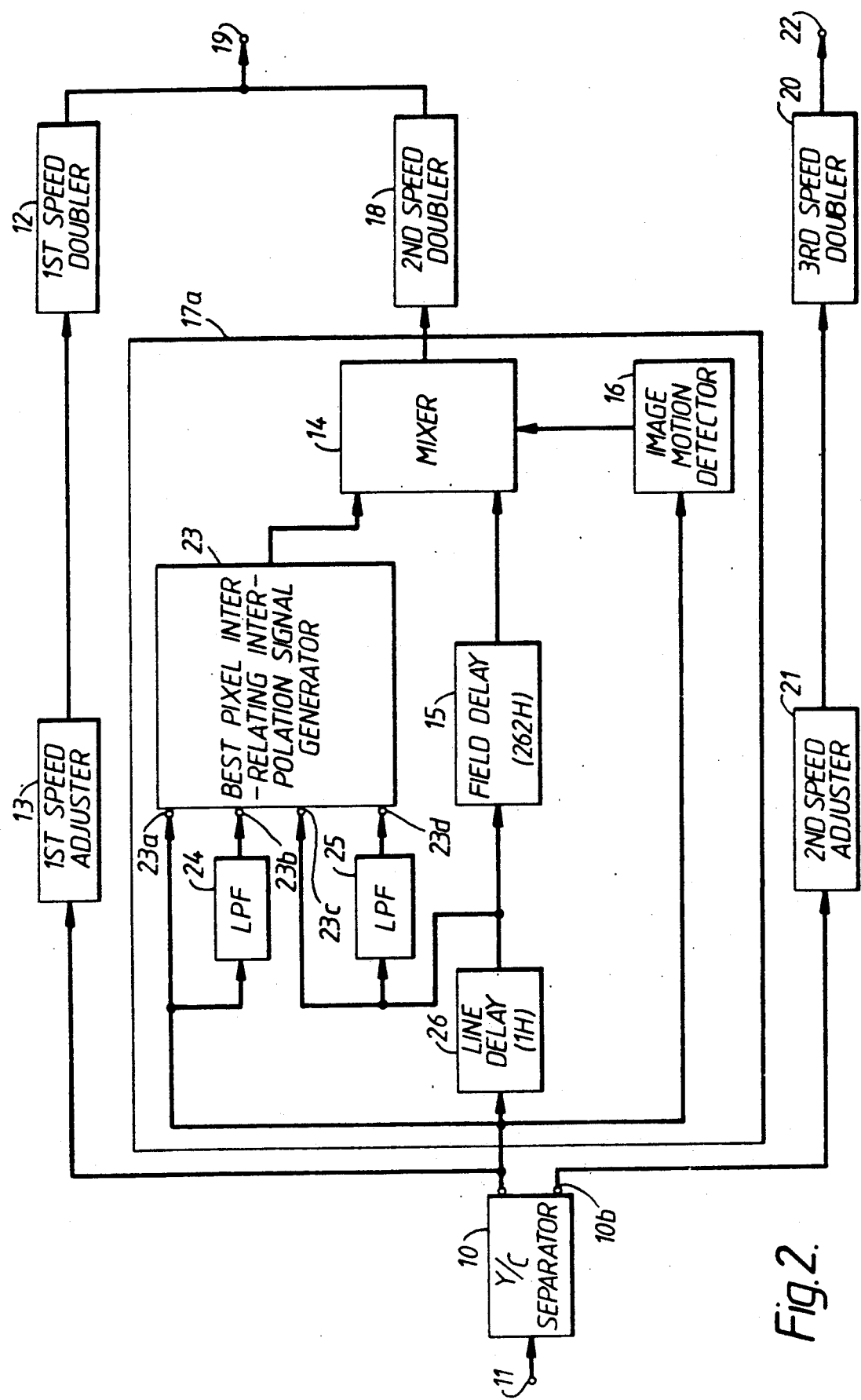
FIG. 2 is a block diagram showing a first embodiment of the interpolation signal generating circuit for a progressive scanning conversion system television receiver according to the present invention.

Referring now to FIG. 2, a first embodiment of the interpolation signal generating circuit for a progressive scanning conversion system television receiver according to the present invention will be described in detail. In FIG. 2, a scanning conversion circuit comprises an interpolation line generating circuit 17a. The interpolation line generating circuit 17a includes a mixer 14, a field delay circuit 15 and a image motion detector 16 in similar to the conventional circuit of FIG. 1. However, the interpolation line generating circuit 17a further includes a best pixel interrelating interpolation signal generator 23, two low pass filters (low pass filter will be referred to as LPF hereinafter) 24 and 25 and a line delay circuit 26. The details of the operation of the interpolation line generating circuit 17a will be described below.

A composite video signal of the interlaced scanning system is applied to a Y/C separator 10 through an input terminal 11. Thus, a Y signal is output from a first output terminal 10a of the Y/C separator 10, while a C signal is output from a second output terminal 10b of the Y/C separator 10. The Y signal is diverged to five paths. The Y signal on a first path is applied to a first speed doubler 12 through a first delay adjusted 13. Thus, a direct Y signal for progressive scanning is output from the first speed doubler 12. The Y signal on a second path is directly applied to a first input terminal 23a of the best pixel interrelating interpolation signal generator 23. The Y signal on a third path is applied to a second input terminal 23b of the best pixel interrelating interpolation signal generator 23 through the LPF 24. The Y signal on a fourth path is applied to the line delay circuit 26. Thus, the Y signal on the fourth path is delayed by one horizontal period (referred to as 1H period). The Y signal on a fifth path is applied to the image motion detector 16.

The 1H delay Y signal output from the line delay circuit 26 is diverged to three paths, i.e., sixth to eighth paths. The 1H delay Y signal on the sixth path is directly applied to a third input terminal 23c of the best pixel interrelating interpolation signal generator 23. The 1H delay Y signal on the seventh path is applied to a fourth input terminal 23d of the best pixel interrelating interpolation signal generator 23 through the LPF 25. The best pixel interrelating interpolation signal generator 23 generates a best pixel interrelating interpolation Y signal by using the Y signals passing through the second and third paths and the 1H delay Y signals passing through the sixth and seventh paths, as described later. The 1H delay Y signal on the eighth path is applied to the mixer 14 through the field delay circuit 15.

The mixer 14, the field delay circuit 15, the image motion detector 16 and the best pixel interrelating interpolation signal generator 23, the LPFS 24 and 25 and the line delay circuit 26 constitute the interpolation line generating circuit 17A. The image motion detector 16 controls the ratio between the best pixel interrelating interpolation signal generator 23 and the field delay circuit 15 in response to a detection signal output from the image motion detector 16. Thus, an interpolation Y signal for the progressive scanning is generated by the mixer 14. The interpolation Y signal output from the mixer 14 is applied to a second speed doubler 18.

The first and second speed doublers 12 and 18 double the scanning speed of both the direct Y signal and the interpolation Y signal. The direct Y signal and the interpolation Y signal output from the first and second speed doublers 12 and 18 are alternately introduced to a interpolation Y signal output terminal 19. Thus, the direct Y signal and the interpolation Y signal are provided for the progressive scanning of the Y signal component.

Figure 3:
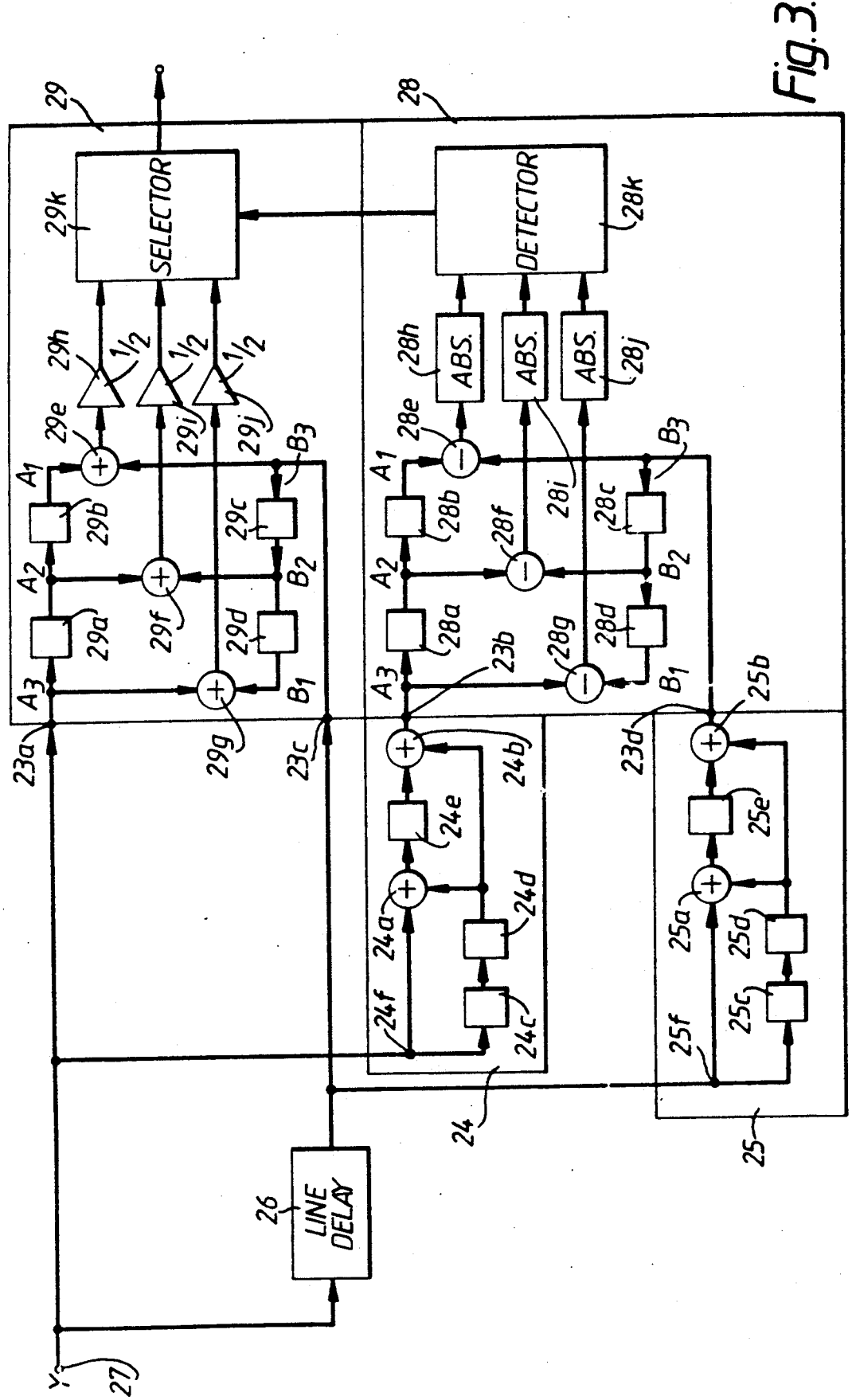
FIG. 3 is a circuit diagram showing the detail of the best pixel interrelating interpolation signal generator 23 and the FIG. 2.

The C signal output from the Y/C separator second output terminal 10b of the Y/C separator 10 is applied to a third speed doubler 20 through a second delay adjuster 21. The third speed doubler 20 also doubles the scanning speed of the C signal. The C signal is introduced to an interpolation C signal output terminal 22. Thus, the C signal is provided for the progressive scanning of the C signal component Referring now to FIG. 3, details of the best pixel interrelating interpolation signal generator 23 and the LPFS 24 and 25 will be described. In FIG. 3, an input terminal 27 is provided for supplying the Y signal output from the Y/C separator 10 to the second, third and fourth paths (see FIG. 2). The input terminal 27 is coupled to the best pixel interrelating interpolation signal generator 23 directly and through the line delay circuit 26 and the LPFS 24 and 25. The best pixel interrelating interpolation signal generator 23 includes a pixel interrelation detector 28 and a best pixel interrelating interpolation signal selector 29. The second and fourth input terminals 23b and 23d of the best pixel interrelating interpolation signal generator 23 are coupled to the pixel interrelation detector 28, while the first and third input terminals 23a and 23c are coupled to the best pixel interrelating interpolation signal generator 29. Thus, the Y signal and the 1H delay Y signal on the third and seventh paths are applied to the pixel interrelation detector 28 through the LPFS 24 and 25. The Y signal and the 1H delay Y signal on the second and seventh paths are applied to the best pixel interrelating interpolation signal generator 29.

The LPFS 24 and 25 have a typical digital filter configuration. For example, the LPF 24 includes two adders 24a and 24b and three latches 24c, 24d and 24e. An input terminal 24f of the LPF 24 is coupled to the latch 24c and one input terminal of the adder 24a. The latch 24d follows the latch 24c. The latch 24d is coupled to another input terminal of the adder 24a and one input terminal of the adder 24b. The latch 24e is connected between the output terminal of the adder 24a and another input terminal of the adder 24b. The output terminal of the adder 24b is coupled to an output terminal 24g of the LPF 24. The output terminal 24g of the LPF 24 is coupled to the second input terminal 23b of the best pixel interrelating interpolation signal generator 23 which is coupled to the pixel interrelation detector 28.

The LPF 25 also includes two adders 25a and 25b and three latches 25c, 25d and 25e, similar to the LPF 24. The adders 25a and 25b and the latches 25c, 25d and 25e of the LPF 25 correspond to the adders 24a and 24b and the latches 24c, 24d and 24e of the LPF 24, respectively. An input terminal 25f of the LPF 25 is coupled to the line delay circuit 26, while an output terminal 25g of the LPF 25 is coupled to the fourth input terminal 23d of the best pixel interrelating interpolation signal generator 23 which is coupled to the pixel interrelation detector 28. The LPFS 24 and 25 reduce a high frequency component of the Y signal or the 1H delay Y signal.

The pixel interrelation detector 28 includes four latches 28a, 28b, 28c and 28d, three subtractors 28e, 28f and 28g, three absolute value calculators 28h, 28i and 28j and a minimum value detector 28k. The second input terminal 23b is coupled to the latch 28a and one input terminal of the subtractor 28g. The latch 28a is coupled to the latch 28b and one input terminal of the subtractor 28f. The latch 28b is coupled to one input terminal of the subtractor 28e. The fourth input terminal 23d is coupled to the latch 28c and another input terminal of the subtractor 28e. The latch 28c is coupled to the latch 28d and another input terminal of the subtractor 28f. The latch 28d is coupled to another input terminal of the subtractor 28g. Output terminals of the subtractors 28e, 28f and 28g are coupled to the minimum value detector 28k through the absolute value calculators 28h, 28i and 28j, respectively.

Figure 4:
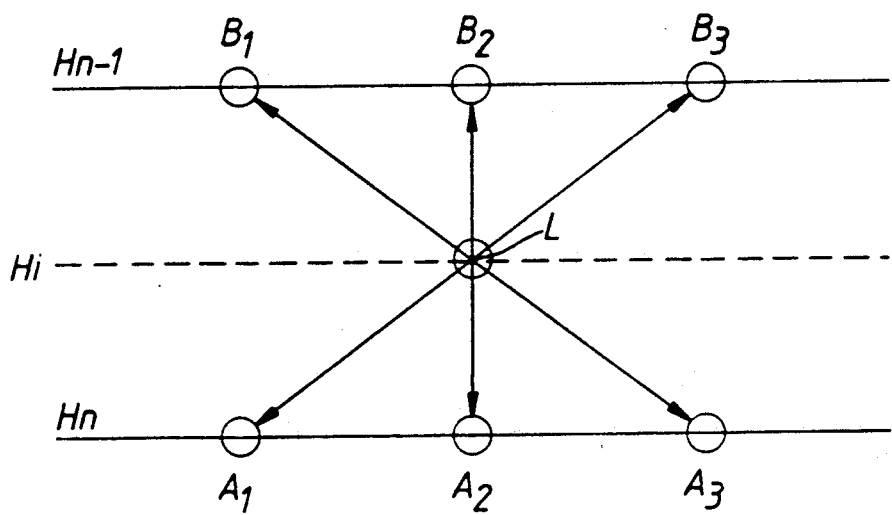
FIG. 4 is a graph showing diagrammatically three predetermined pairs of pixels on two successive lines for explaining the operation of FIG. 3.

Now the operation of the pixel interrelation detector 28 will be described in reference to FIG. 4. FIG. 4 diagrammatically shows three predetermined pairs of pixels on two successive lines, i.e., a prescribed current line Hn and a corresponding prior line Hn-1 for processing an interpolation line Hi. In FIG. 4, a pixel L represents an interpolation pixel to be processed by a suitable pair selected from three pixel pairs i.e. A1=B3, A2=B2, A3=B1. For example, if the pixels A1 and B3 of the first pair A1=B3 are on the same line image so that they have the highest interrelation among three pixel pairs, the first pixel pair A1=B3 is detected as a best pair for generating the interpolation pixel L, as described later. The interpolation pixel L is given by an average value of the pixels of the first pixel pair A1=B3. Thus, the interpolation pixel L can naturally link the pixels A1 and B3 as a part of the line image.

Now, the operation of the pixel interrelation detector 28 for placing the interpolation pixel L will be described in detail. All circuit elements of the pixel interrelation detector 28 are driven by a clock signal CK which matches with the frequency of the pixels. The Y signals Ya1, Ya2 and Ya3 of the pixels A1, A2 and A3 on the current line Hn are successively applied to the second input terminal 23b of the pixel interrelation detector 28. The Y signals Yb1, Yb2 and Yb3 of the pixels B1, B2 and B3 on the prior line Hn-1 are successively applied to the fourth input terminal 23d of the pixel interrelation detector 28 through the line delay circuit 26. First, the Y signals Ya1 and Yb1 are simultaneously applied to the pixel interrelation detector 28. Secondarily, the Y signals Ya2 and Yb2 are simultaneously applied to the pixel interrelation detector 28. Then, the Y signals Ya3 and Yb3 are simultaneously applied to the pixel interrelation detector 28. The latches 28a and 28b successively latch the Y signals supplied from the second input terminal 23b.

Thus, the Y signals Ya1, Ya2 and Ya3 are simultaneously applied to the subtractors 28e, 28f and 28g.

Also, the Y signals Yb1, Yb2 and Yb3 are simultaneously applied to the subtractors 28g, 28f and 28e at the time. The Y signals Ya1 and Yb3 are subtracted with each other in the subtractor 28e. The difference of the Y signals Ya1 and Yb3 is applied to the absolute value calculator 28h. The absolute value calculator 28h converts the difference into a first absolute value |Ya1 − Yb3|. This first absolute value |Ya1 − Yb3| is applied to the minimum value detector 28k. The Y signals Ya2 and Yb2 are subtracted with each other in the subtractor 28f. The difference of the Y signals Ya2 and Yb2 is applied to the absolute value calculator 28i. The absolute value calculator 28i converts the difference into a second absolute value |Ya2 − Yb2|. This second absolute value |Ya2 − Yb2| is applied to the minimum value detector 28k. The Y signals Ya3 and Yb1 are subtracted with each other in the subtractor 28g. The difference of the Y signals Ya3 and Yb1 is applied to the absolute value calculator 28j. The absolute value calculator 28j converts the difference into a third absolute value |Ya3 − Yb1|. This third absolute value |Ya3 − Yb1| is applied to the minimum value detector 28k.

The minimum value detector 28k detects a minimum one among these three absolute values. Thus, the minimum value detector 28k generates a minimum value judgement signal. This minimum value judgement signal is applied to a control terminal of the best pixel interrelating interpolation signal generator 29.

The best pixel interrelating interpolation signal generator 29 includes four latches 29a, 29b, 29c and 29d, three adders 29e, 29f and 29g, three attenuators 29h, 29i and 29j and a selector 29k. The first input terminal 23a is coupled to the latch 29a and one input terminal of the adder 29g. The latch 29a is coupled to the latch 29b and one input terminal of the adder 29f. The latch 29b is coupled to one input terminal of the adder 29e. The third input terminal 23c is coupled to the latch 29c and another input terminal of the adder 29e. The latch 29c is coupled to the latch 29d and another input terminal of the adder 29f. The latch 29d is coupled to another input terminal of the adder 29g. Output terminals of the adders 29e, 29f and 29g are coupled to the selector 29k through the attenuators 29h, 29i and 29j, respectively.

The Y signals Ya1, Ya2 and Ya3 of the pixels A1, A2 and A3 on the current line Hn are successively applied to the first input terminal 23a of the best pixel interrelating interpolation signal generator 29. The Y signals Yb1, Yb2 and Yb3 of the pixels B1, B2 and B3 on the prior line Hn-1 are successively applied to the third input terminal 23c of the best pixel interrelating interpolation signal generator 29 through the line delay circuit 26. First, the Y signals Ya1 and Yb1 are simultaneously applied to the best pixel interrelating interpolation signal generator 29. Secondarily, the Y signals Ya2 and Yb2 are simultaneously applied to the best pixel interrelating interpolation signal generator 29. Then, the Y signals Ya3 and Yb3 are simultaneously applied to the best pixel interrelating interpolation signal generator 29. The latches 29a and 29b successively latch the Y signals supplied from the first input terminal 23a.

Thus, the Y signals Ya1, Ya2 and Ya3 are simultaneously applied to the adders 29e, 29f and 29g. Also, the Y signals Yb1, Yb2 and Yb3 are simultaneously applied to the adders 29g, 29f and 29e at the time. The Y signals Ya1 and Yb3 are added with each other in the adder 29e. The sum of the Y signals Ya1 and Yb3 is applied to the attenuator 29h. The attenuator 29h halves the sum. Thus, a first average value Ya1//Yb3 is applied to the selector 29k. The Y signals Ya2 and Yb2 are added with each other in the adder 29f. The sum of the Y signals Ya2 and Yb2 is applied to the attenuator 29i. The attenuator 29i halves the sum. Thus, a second average value Ya2//Yb2 is applied to the selector 29k. The Y signals Ya3 and Yb1 are added with each other in the adder 29g. The sum of the Y signals Ya3 and Yb1 is applied to the attenuator 29j. The attenuator 29j halves the sum. Thus, a third average value Ya3//Yb1 is applied to the selector 29k.

The selector 29k selects a prescribed one among these three average values under the control of the minimum value judgement signal output from the minimum value detector 28k. Thus, the operation of the selector 29k responds to the operation of the minimum value detector 28k. For example, when the absolute value |Ya1 − Yb3| obtained from the absolute value calculator 28h is detected by the minimum value detector 28k as the minimum value, the selector 29k selects the first average value Ya1//Yb3 obtained by the attenuator 29h as the best pixel interrelating interpolation Y signal. This first average value Ya1//Yb3 is applied to the mixer 14 as a selected dynamic Y signal (see FIG. 2). In the mixer 14, the selected dynamic Y signal is combined with the static Y signal output from the field delay circuit 15.

The selection of the best pixel interrelating interpolation Y signal depends on the operation of the pixel interrelation detector 28, as described above. However, the pixel interrelation detector 28 itself is apt to error in the detection of the highest interrelating pixel pair. The LPFS 24 and 25 prevent such a malfunction of the pixel interrelation detector 28.

The advantage of the LPFS 24 and 25 will now be described in detail by comparing the separation of a system including them with an imaginary case in which the LPFS 24 and 25 are not provided.

First, the imaginary case will be described in reference to FIG. 5. FIG. 5 is a waveform chart showing signals in FIG. 3 wherein the LPFS 24 and 25 are deleted. Graph 5A shows the clock signal CK. Graphs 5B and 5C show the current line Hn and the prior line Hn-1. Here, it is assumed that several left declining oblique image lines are present. For example, the pixel A1 on the current line Hn and the pixel B3 on the prior line Mn-1 are found on the left of the left declining oblique image lines. Graphs 5D, 5E and 5F show the first, second and third absolute values output from the absolute value calculators 28h, 28i and 28j. Graphs 5G, 5H and 5I show the first, second and third average values output from the attenuators 29h, 29i and 29j.

The minimum value detector 28k detects a minimum value among the signals 5D, 5E and 5F for every clock signal CK. The selector 29k selects the average value of a particular average value signal corresponding to the particular one which is minimum among the absolute value signals 5D, 5E and 5F. Thus, signal 5J is output from the best pixel interrelating interpolation signal generator 29 or the selector 29k. This signal 5J is the interpolation line Hi to be scanned between the current line Hn and the prior line Hn-1. As shown in FIG. 6, the signal 5J lacks interpolation pixels for some left declining oblique image lines, e.g., the leftside one.

Now the operation of the practical embodiment including the LPFS will be described in reference to FIG. 6. FIG. 6 is a waveform chart showing signals in FIG. 3. Graph 6A shows the clock signal CK. Graphs 6B and 6C show the current line Hn and the prior line Hn-1. These signals 6A, 6B and 6C correspond to the signals 5A, 5B and 5C of the imaginary case, as shown in FIG. 5. Graphs 6D and 6E show signals output from the LPFS 24 and 25. The LPFS 24 and 25 suppress the higher frequency components of the signals 6B end 6C. Thus, the waveforms of the signals 6D and 6E are rounded, as shown in the drawing. For example, each portion corresponding to the pixel such as A1 and B3 gradually increases and decreases by two steps.

Graphs 6F, 6G and 6H show the first, second and third absolute values output from the absolute value calculators 28h, 28i and 28j, respectively. Graphs 6I, 6J and 6K show the first, second and third average values output from the attenuators 29h, 29i and 29j, respectively.

The minimum value detector 28k detects the minimum value among the signals 6I, 6J and 6K for every clock signal CK. The selector 29k selects the average value of the particular average value signal corresponding to the particular one which is minimum among the absolute value signals 6F, GE and 6H. Thus, signal 6J is output from the best pixel interrelating interpolation signal generator 29 or the selector 29k. This signal 6L is the interpolation line Hi to be scanned between the current line Hn and the prior line Hn-1. As shown in FIG. 6, the signal 6L includes interpolation pixels suitably corresponding to the left declining oblique image lines.

Accordingly, this embodiment can prevent the malfunction of the pixel interrelation detector 28 by suppressing the higher frequency components of the line signals provided for detecting interrelations of pixel pairs. Further, interference of the higher frequency components of the line signals sometimes effects a pixel pair with less interrelation. Thus, the pixel interrelation detector 28 may then wrongly detect that pixel pair with the less interrelation instead of a pixel pair with the highest interrelation, if the LPFS 24 and 25 are not provided. This incorrect interpolation degrades the quality of the image produced. However, the LPFS 24 end 25 act to prevent such a wrong interpolation. The LPFS 24 and 25 also act to suppress noise in the high frequency region. Thus, the operation of the pixel interrelation detector 28 is protected from disturbance caused by the noise.

Referring now to FIG. 7, a second embodiment of the interpolation signal generating circuit for a progressive scanning conversion system television receiver according to the present invention will be described in detail. FIG. 7 shows in detail another best pixel interrelating interpolation signal generator 23A which corresponds to the best pixel interrelating interpolation signal generator 23 as shown in FIG. 3. In FIG. 7, an input terminal 27 is provided for supplying the Y signal output from the Y/C separator 10 to the second, third and fourth paths (see FIG. 2). The input terminal 27 is coupled to the best pixel interrelating interpolation signal generator 23A directly and through the line delay circuit 26, the LPFS 24 and 25. The best pixel interrelating interpolation signal generator 23A includes a pixel interrelation detector 28 and a best pixel interrelating interpolation signal selector 29A. The second and fourth input terminals 23b and 23d of the best pixel interrelating interpolation signal generator 23A are coupled to the pixel interrelation detector 28, while the first and third input terminals first input terminals 23a and 23c are coupled to the best pixel interrelating interpolation signal selector 29A. Thus, the Y signal and the 1H delay Y signal on the third and seventh paths are applied to both the pixel interrelation detector 28 and to the best pixel interrelating interpolation signal selector 29A through the LPFS 24 and 25.

The LPFS 24 and 25 have a typical digital filter configuration, e.g., the same circuit construction as those as shown in FIG. 3. The LPFS 24 and 25 reduce the high frequency component of the Y signal and the 1H delay Y signal.

The pixel interrelation detector 28 has the same circuit construction as the one as shown in FIG. 3 so that description of the circuit construction and the operation of the pixel interrelation detector 28 will be eliminated here for simplicity of explanation.

The best pixel interrelating interpolation signal selector 29A includes three adders 29e, 29f and 29g, three attenuators 29h, 29i and 29j and a selector 29k. The best pixel interrelating interpolation signal selector 29A lacks latches corresponding to the latches 29a, 29b, 29c and 29d as shown in FIG. 3. However, the latches 28a, 28b, 28c and 28d of the pixel interrelation detector 28 serve as the latches of the best pixel interrelating interpolation signal selector 29A. Thus, the second input terminal 23b is further coupled to one input terminal of the adder 29g. The latch 28a is further coupled to one input terminal of the adder 29f. The latch 28b is further coupled to one input terminal of the adder 29e. The fourth input terminal 23d is further coupled to another input terminal of the adder 29e. The latch 28c is further coupled to another input terminal of the adder 29f. The latch 28d is further coupled to another input terminal of the adder 29g. Output terminals of the adders 29e, 29f and 29g are coupled to the selector 29k through the 29h, 29i and 29j, respectively.

The best pixel interrelating interpolation signal selector 29A operates like the best pixel interrelating interpolation signal generator 29 as shown in FIG. 3, so that the description of the operation of the best pixel interrelating interpolation signal selector 29A will be eliminated here for the simplicity of explanation.

The best pixel interrelating interpolation signal generator 23A further includes a compensation circuit 30. The compensation circuit 30 has two adders 31 and 32, an attenuator 33, a third delay adjuster 34 and a subtractor 35. One input terminal of the adder 31 is directly coupled to the input terminal 27. Another input terminal of the adder 31 is coupled to the input terminal 27 through the line delay circuit 26. Thus, a direct Y signal and a 1H delay Y signal are added together in the adder 31. The sum of the direct and 1H delay Y signals is applied to the attenuator 33. The attenuator 33 halves the sum. Thus, an average value of the direct and 1H delay Y signals is output from the attenuator 33. The averaged Y signal is applied to the third delay adjuster 34. The output terminal of the adder 31 is coupled to the attenuator 33. The third delay adjuster 34 is used for matching phases of the averaged Y signal with the phase of the interpolation Y signal, similar to the first and second delay adjusters 13 and 21 (see FIGS. 1 or 3).

The averaged Y signal passing through the third delay adjuster 34 is applied to one input terminal of the subtractor 35. Another input terminal of the subtractor 35 is coupled to the output terminal of the attenuator 29i. The attenuator 29i generates the average value A2//B2 of the pixels A2 and B2 on the current line Hn and the prior line Hn-1, as described before in reference to FIGS. 3 and 4. The average value A2//B2 excludes the high frequency components of the Y signal, while the averaged Y signal passing through the third delay adjuster 34 includes the entire frequency band of the Y signal. Thus, the subtractor 35 eliminates the low frequency components of the Y signal, and outputs only the high frequency components of the Y signal.

The high frequency components of the Y signal output from the subtractor 35 are applied to one input terminal of the adder 32. Another input terminal of the adder 32 is coupled to the output terminal of the selector 29k. Thus, the interpolation Y signal output from the adder 32 is compensated with the high frequency components of the Y signal which are obtained by processing the pixels A2 and B2 of the current line Hn and the prior line Hn-i.

According to the second embodiment, as shown in FIG. 7, the detection of a best interrelated pixel pair is carried out by using Y signals without high frequency components. Thus, a prescribe pixel pair with the best interrelation is provided for generating an interpolation Y signal. The interpolation Y signal obtained by the best pixel interrelating interpolation signal selector 29A itself lacks high frequency components. However, the high frequency components are added through the compensation circuit 30. Thus, the interpolation Y signal with the entire frequency band is obtained.

Figure 8:
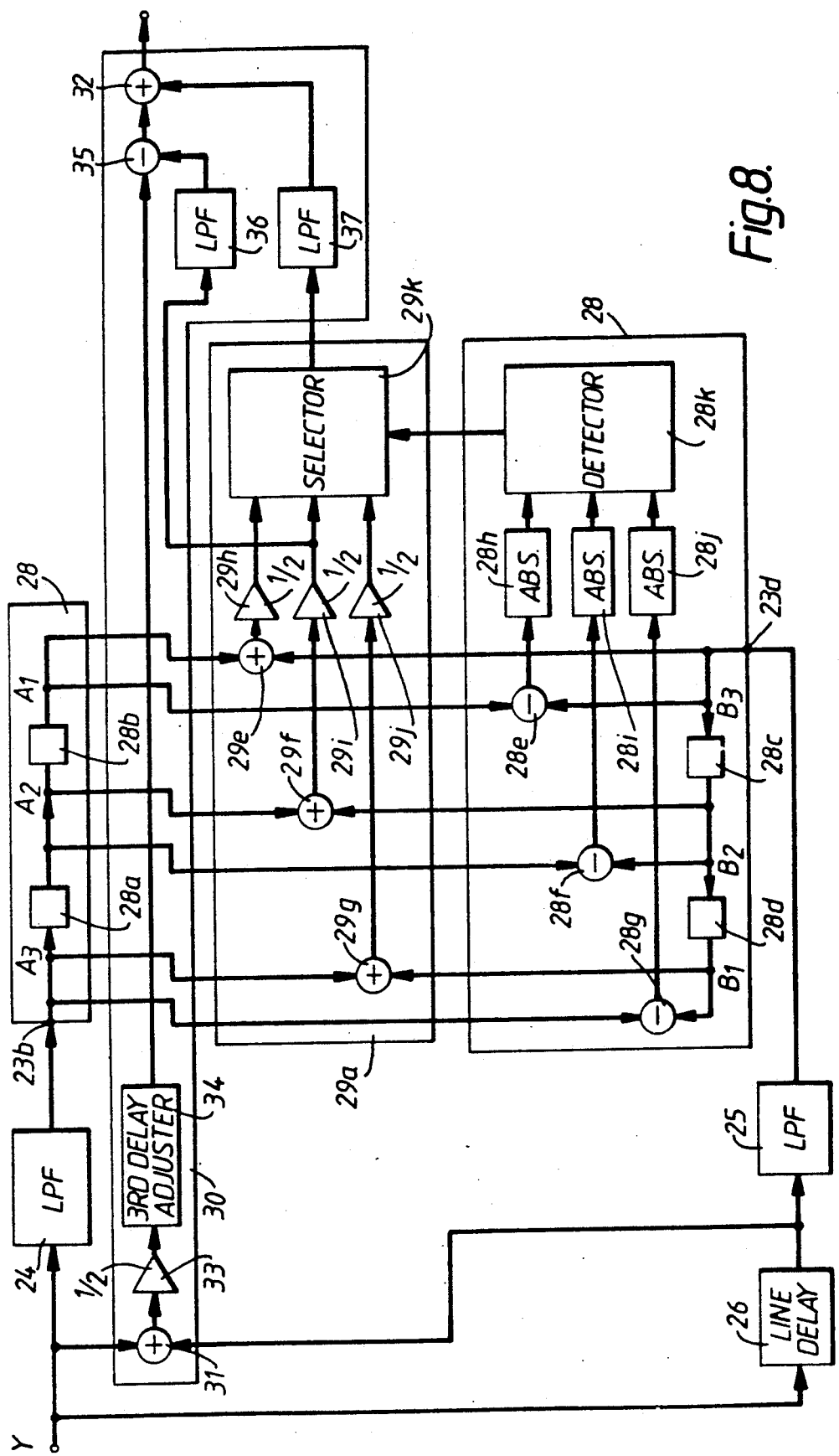
FIG. 8 is a block diagram showing a third embodiment of the interpolation signal generating circuit for a progressive scanning conversion system television receiver according to the present invention.
Figure 9A:
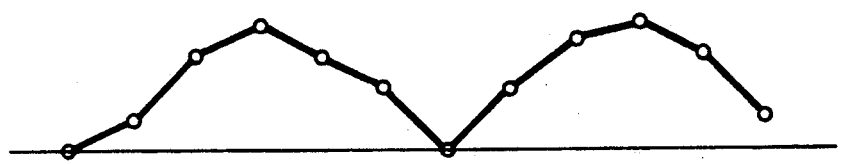
FIGS. 9A–9K is a waveform chart showing signals in FIG. 8.
Figure 9B:
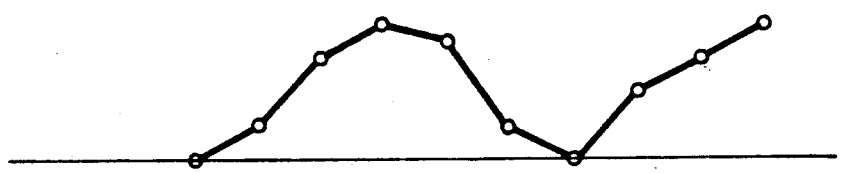
Figure 9C:
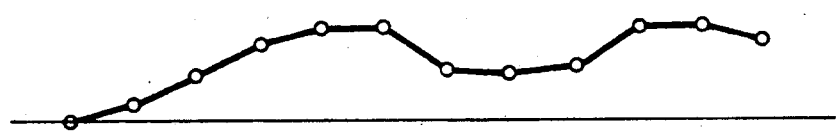
Figure 9E:
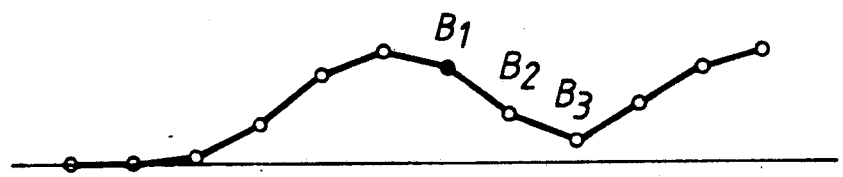
Figure 9D:
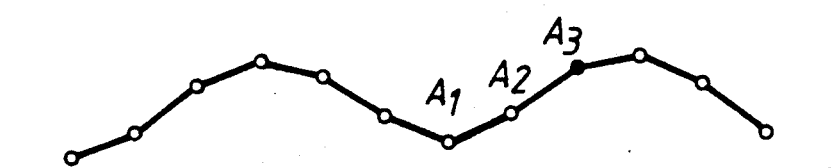
Figure 9F:
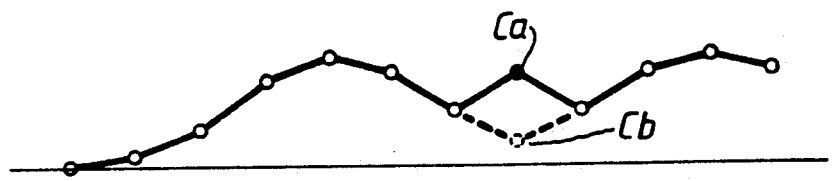
Figure 9G:
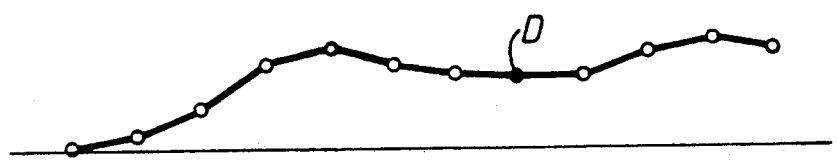
Figure 9H:
Figure 9I:
Figure 9J:
Figure 9K:
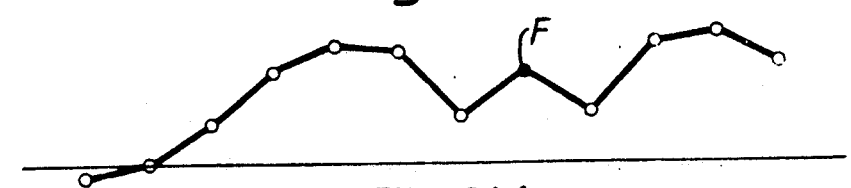

Referring now to FIG. 8, a third embodiment of the interpolation signal generating circuit for a progressive scanning conversion system television receiver according to the present invention will be described in detail. This third embodiment of the interpolation signal generating circuit relates to an improvement of the second embodiment, as shown in FIG. 7. FIG. 8 shows a detail of another compensation circuit 30A which corresponds to the compensation circuit 30 as shown in FIG. 7.

In FIG. 8, the best pixel interrelating interpolation signal generator 23A has the same construction as the best pixel interrelating interpolation signal generator 23A of the second embodiment, as shown in FIG. 7. Thus, description of the construction and the operation of the best pixel interrelating interpolation signal generator 23A will be eliminated here for the simplicity of explanation. The compensation circuit 30A has a circuit construction similar to the compensation circuit 30 of the second embodiment, as shown in FIG. 7. However, the compensation circuit 30A further includes two LPFS 36 and 37. The LPF 36 is coupled between the output terminal of the attenuator 29i and the subtractor 35. The LPF 37 is coupled between the output terminal of the selector 29k and the adder 32. Thus, the LPFS 36 and 37 remove high frequency components from the averaged Y signal A2//B2 output from the attenuator 29i and the selected averaged Y signal output from the selector 29k. The Y signals input to the best pixel interrelating interpolation signal generator 23A have not these high frequency components eliminated, as described before. However, other high frequency components, e.g., high frequency impulse noises, occur in the best pixel interrelating interpolation signal generator 23A during the process for generation of the interpolation Y signal. Such impulse noises are removed from the outputs of the best pixel interrelating interpolation signal generator 23A, i.e., from the interpolation Y signal output from the best pixel interrelating interpolation signal selector 29A and the average value signal A2//B2 output from the attenuator 29i, by the LPFS 36 and 37.

Now the advantage of the LPFS 36 and 37 will be described in detail in reference to FIG. 9. FIG. 9 is a waveform chart showing signals in FIG. 8. Graph 9A shows the direct Y signal applied to the one input terminal of the adder 31. Graph 9B shows the 1H delay Y signal applied to the other input terminal of the adder 31 through the line delay circuit 26. These signals 9A and 9B are added with each other in the adder 31. Then the sum obtained by the adder 31 is halved by the attenuator 33. Graph 9C shows the averaged value signal A2//B2 output from the attenuator 33.

The direct Y signal 9A and the 1H delay Y signal 9B are also applied to the second input terminal 23b and the fourth input terminal 23d of the best pixel interrelating interpolation signal generator 23A through the LPFS 24 and 25, respectively. Graphs 9D and 9E show the signals input to the second input terminal 23b and the fourth input terminal 23d of the best pixel interrelating interpolation signal generator 23A. Here, it is assumed that three dots A1, A2 and A3 on the signal 9D represent three successive pixels of the current line Hn. Also, it is assumed that three dots B1, B2 and B3 on the signal 9E represent three successive pixels of the prior line Hn-1. The pixels B1, B2 and B3 on the signal 9E correspond to the pixels A1, A2 and A3 on the signal 9D. Then, the best pixel interrelating interpolation signal generator 23A selectively outputs an average signal of a predetermined pixel pair with the highest pixel interrelation. Graph 9F shows the selected interpolation Y signal output from the selector 29k of the best pixel interrelating interpolation signal-selector 29A.

Now comparing three predetermined pixel pairs, A1=B3, A2=B2 and A3=B1, the pixel pair A1=B3 has the highest interrelation. Thus, the interpolation Y signal 9F ought to have an interpolation pixel Cb, as shown on the graph 9F, in correspondence with the pixel pair A1=B3. However, the interpolation Y signal 9F has a wrong interpolation pixel, shown as Ca. Such a wrong interpolation pixel, e.g., the pixel Ca, occurs due to the high frequency impulse noises generated in the best pixel interrelating interpolation signal generator 23A. The wrong interpolation pixel, e.g., the pixel Ca, fails to have a smooth succession with adjacent pixels. Thus, the wrong interpolation pixel Ca includes the high frequency impulse noise components.

The interpolation signal 9F is applied to the LPF 37. The LPF 37 eliminates the high frequency impulse noise components from the interpolation signal 9F. Thus, a signal as shown by a graph 9G is output from the LPF 37. In the signal 9G, an interpolation pixel D corresponding to the wrong interpolation pixel Ca of the signal 9F is depressed so that the interpolation pixel D has smooth successions with adjacent pixels. This is because the high frequency impulse noise components are eliminated by the LPF 37.

The averaged value signal A2//B2 output from the attenuator 29i is applied to the LPF 36. This averaged value signal A2//B2 corresponds to a half of the sum between the signals 9D and 9E. The LPF 36 also eliminates such a high frequency impulse noise components from the averaged value signal A2//B2. Graph 9H shows the signal output from the LPF 36. The signal 9H and the signal 9C are applied to the subtractor 35. Thus, a signal as shown by a graph 9I is output from the subtractor 35. This signal 9I contains only the high frequency components of the Y signal, as described above. The signal 9I is then added with the signal 9G in the adder 32 for compensating the signal 9G.

Graph 9J shows a signal output from the adder 32, i.e., the interpolation Y signal for the progressive scanning system. In this interpolation Y signal 9J, an interpolation pixel E corresponds to the interpolation pixel D in the signal 9G. As shown by Graph 9J, the interpolation pixel E also has smooth successions with adjacent pixels.

Graph 9K shows a signal obtained by the best pixel interrelating interpolation signal generator 23A of the second embodiment, as shown in FIG. 7, when the signal 9A is applied the best pixel interrelating interpolation signal generator 23A. In this case, the signal 9K includes a wrong interpolation pixel F which corresponds to the wrong interpolation pixel Ca in the signal 9F. The interpolation pixel F also fails to have smooth successions with adjacent pixels. The LPFS 36 and 37 prevent such a wrong interpolation pixel caused by the high frequency impulse noise components generated in the best pixel interrelating interpolation signal generator 23A.

Referring now to FIG. 10, a fourth embodiment of the interpolation signal generating circuit for a progressive scanning conversion system television receiver according to the present invention will be described in brief. This fourth embodiment of the interpolation signal generating circuit relates to an improvement of the first embodiment, as shown in FIG. 3. In FIG. 10, the interpolation signal generating circuit further includes two LPFS 38 and 39, a subtractor 41 and an adder 40.

The LPF 38 is coupled between the selector 29k and one input terminal of the adder 40. Thus, the LPF 38 can prevent a malfunction of the best pixel interrelating interpolation signal generator 23 due to such high frequency noise components, as described earlier with regard to the third embodiment. However, the signal output from the LPF 38 fails to have necessary high frequency components.

The LPF 39 is coupled between the output terminal of the attenuator 29i and one input terminal of the subtractor 41. Another input terminal of the subtractor 41 is directly coupled to the output terminal of the attenuator 29i. Thus, the averaged Y signal A2//B2 directly applied to the other input terminal of the 41 from the attenuator 29i includes the entire frequency components, while the signal applied to the one input terminal of the subtractor 41 through the LPF 39 includes only the low frequency components. The subtractor 41 outputs the high frequency components. This high frequency components are added with the interpolation Y signal output from the LPF 38 in the adder 40. Thus, the interpolation Y signal output from the adder 40 contains the high frequency components.

In the above embodiments, the best pixel interrelating interpolation signal generator 23 or 23A is constructed for processing three pixel pairs on two successive lines of the interlaced scanning system. However, it is easy to change the construction of the best pixel interrelating interpolation signal generator 23 or 23A for processing five or more pixel pairs. In this case, circuit elements such as latches, etc. are increased as required. Further, it is easy to change the construction of the best pixel interrelating interpolation signal generator 23 or 23A for processing four or more lines. In the best pixel interrelating interpolation signal generator is so changed, the number of the direct Y signals and properly delayed Y signal are properly increased as required.

As described above, the present invention provides an extremely preferable interpolation signal generating circuit for a progressive scanning conversion system television receiver.

While there have been illustrated and described what are at present considered to be the preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A system for generating interpolation signals for the progressive scanning conversion television system, comprising:

means for receiving a digital television signal;

an interpolation signal generating circuit for receiving the digital television signal and generating an interpolation signal, the interpolation signal generating circuit including at least one low pass filter to remove the high frequency signal components from the interpolation signal;

means for generating a control signal based upon the interrelation between selected pixels, the control signal being used to generate the interpolation signals; and means for providing the digital television signal and the interpolation signal to generate a progressive scanning television signal.

2. A system for generating interpolation signals for a progressive scanning conversion television system in claim 1 further comprising means coupled to the receiving means for separating the luminance and chrominance signals from the digital television signal.

3. A system for generating interpolation signals for a progressive scanning conversion television system in claim 2, wherein the interpolation signal generating circuit uses the separated luminance signal and a separated luminance signal which has been displayed by one horizontal sweep period to generate the interpolation signal.

4. A system for generating interpolation signals for a progressive scanning conversion television system in claim 3, wherein the at least one low pass filter comprises one low pass filter used to remove the high frequency components from the separated luminance signal and another low pass filter used to remove the high frequency components from the delayed luminance signal.

5. A system for generating interpolation signals for a progressive scanning conversion television system, comprising:

means for receiving a digital television signal;

an interpolation signal generating circuit for receiving the digital television signal and generating an interpolation signal, the interpolation signal generating circuit including at least one low pass filter to remove the high frequency signal components from the interpolation signal;

means for providing the digital television signal and the interpolation signal to generate a progressive scanning television signal; and at least one additional low pass filter connected to receive the interpolation signal from the interpolation signal generating circuit and remove therefrom any high frequency components present in the interpolation signal.

6. A system for generating interpolation signals for a progressive scanning conversion television system in claim 1, including a high frequency compensation circuit for detecting the high frequency components in the digital television signal and adding the high frequency components to the interpolation signal.

7. A system for generating interpolation signals for a progressive scanning conversion television system comprising:

means for receiving a digital television signal;

an interpolation signal generating circuit for receiving the digital television signal and generating an interpolation signal, the interpolation signal generating circuit including at least one low pass filter to remove the high frequency signal components from the interpolation signal;

means for providing the digital television signal and the interpolation signal to generate a progressive scanning television signal; and means coupled to the receiving means for separating the luminance and chrominance signals from the digital television signal;

wherein the interpolation signal generating circuit includes a pixel interrelation detector connected to receive both the separated luminance signal and a delayed luminance signal through a low pass filter and to generate a control signal indicating the degree of interrelation between selected pixels in the separated luminance signal and the delayed luminance signal, which control signal is used to generate the interpolation signal.

* * * * *